United States Patent Office 3,555,437
Patented Jan. 12, 1971

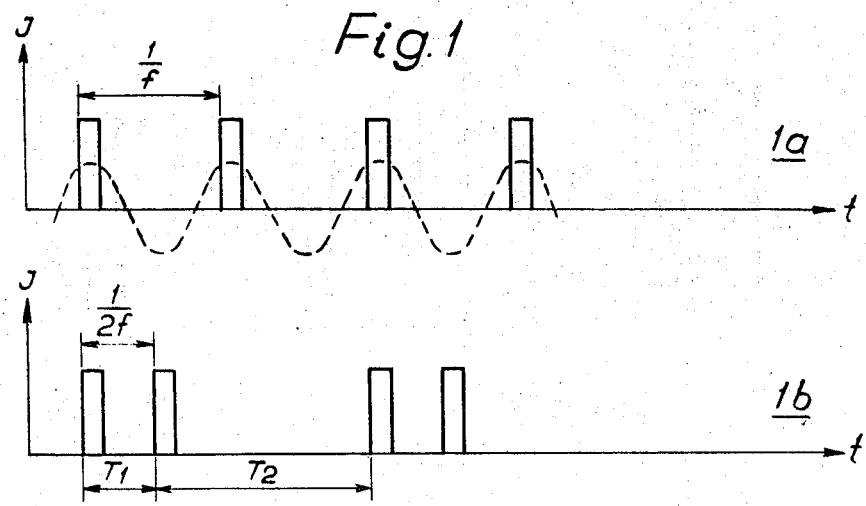
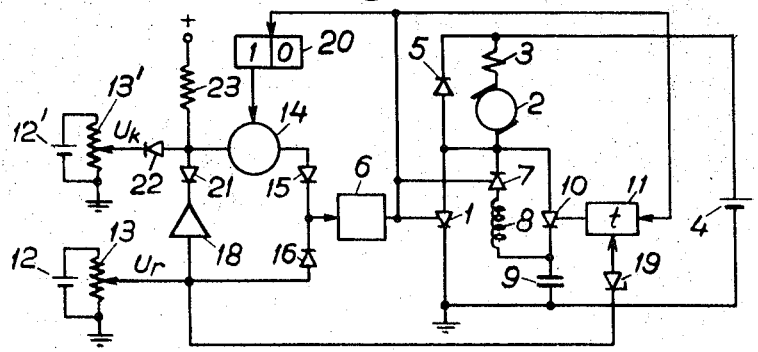
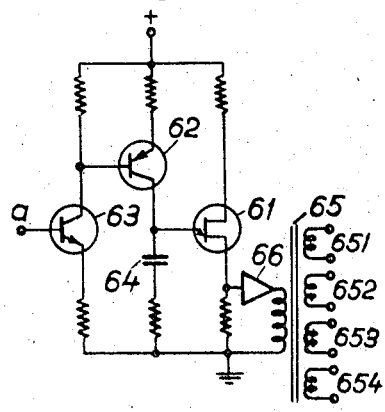
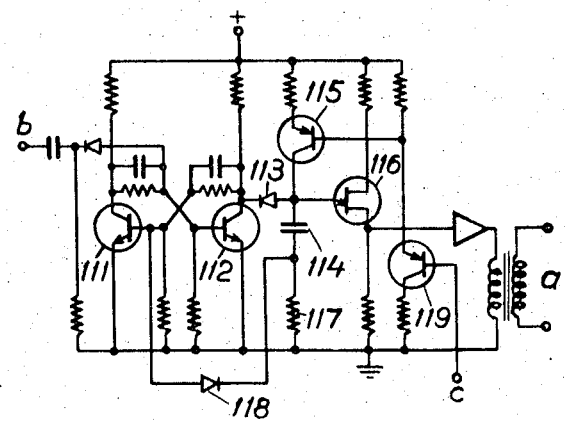

3,555,437
METHOD AND MEANS FOR SUPPRESSING AN A.C. COMPONENT OF A GIVEN FREQUENCY IN A PULSED D.C. CURRENT
Erik Persson and Karl Gunnar Goliath, Vasteras, Sweden, assignors to Allmanna Svenska Elektriska Aktiebolaget, Vasteras, Sweden, a corporation of Sweden
Filed Dec. 26, 1968, Ser. No. 787,180
Claims priority, application Sweden, Dec. 27, 1967, 17,792/67; Apr. 29, 1968, 5,763/68
Int. Cl. H03b 1/04
U.S. Cl. 328—165                    8 Claims

ABSTRACT OF THE DISCLOSURE

For supplying to a motor D.C. pulses with a variable frequency while suppressing an A.C. component of a given frequency ($f$), a switching device is connected between a source of D.C. and the motor, which is rendered alternately conducting and nonconducting so as to supply the motor with pulses in groups of $n$ pulses per group. The time interval between the groups can be varied, while the time interval $\Delta t$ between successive pulses in each group is kept constant and equal to $$\frac{1}{f \cdot n}$$

as long as the average value of the pulse frequency is below the value at which the time interval between successive groups is less than $\Delta t$. At higher average values of the pulse frequency, up to a certain preselected value, the pulse length is kept substantially constant, while, if the load voltage is to be increased above that corresponding to such preselected value, the pulse length is increased while the pulse frequency is kept substantially constant.

BACKGROUND OF THE INVENTION (1) Field of the invention

The present invention relates to a method for suppression of an A.C. component of a given frequency ($f$) in the current from a D.C. source when supplying a load object from the D.C. source with D.C. pulses having a variable pulse frequency.

(2) The prior art

It is known to feed a load object, for example a D.C. motor, from a D.C. source through a switching means, for example a thyristor, which alternates between conducting and nonconducting state so that D.C. pulses are supplied to the load. By varying the pulse length or pulse frequency the average value of the load current can be regulated. In certain cases at certain pulse frequencies the load current may cause disturbances in other equipment operating with these frequencies or the lower or higher harmonics in them. This may occur in certain rail vehicles when the rails are used both as return conductors for the load current and as parts of a signal system operating with alternating current having relatively low frequency. In such cases it is extremely important to suppress an A.C. component of a certain frequency in the load current from the network. This can be done, for example, with the help of capacitive smoothing of the current or through a filter tuned to the frequency in question. With the high currents and low frequencies which are often used the filters are expensive and space-consuming if they are to be made so effective that no other measures need to be taken.

SUMMARY OF THE INVENTION

The present invention relates to a method of controlling the switching member, with the help of which the above-mentioned disadvantages are avoided. The method is characterised in that, when the average value of the pulse frequency is below a certain limit, the load object is supplied with pulses in groups of $n$ pulses, with variable time-lag between the groups and with such a constant time-lag $\Delta t$ between the pulses in the group that $$\Delta t = \frac{1}{f \cdot n}$$

said limit value being the average frequency when the time-lag between two consecutive groups is $\Delta t$.

The time-lag between two pulses refers to the time between two closings of the switching device connected in series with the load. The time-lag between two groups refers to the time-lag between the last pulse of the first group and the first pulse of the second group.

The method according to the invention provides in a simple manner an extremely effective suppression of the undesired current component. When there are, for example, two pulses in each group, these pulses generate two A.C. components of the same frequency displaced 180°, and these cancel each other at every moment. With three pulses in each group three currents displaced 120° are obtained, the sum of which is similarly always zero.

The simplest method is obtained if each group contains two pulses which then have a time-lag $$\Delta t = \frac{1}{2f}$$

With increasing output from a low value, that is, with increasing average value of the load voltage, the time-lag between the groups of pulses decreases. When this time-lag is the same as the time-lag between the pulses in the group, the same time-lag is obtained between all pulses, and the pulse frequency is $n \cdot f$. At further increased output equal time-lag between all pulses is maintained so that the output is increased by decreasing the time-lag between the pulses, increasing the pulse length or a combination of these steps.

According to a preferred embodiment the pulse length is kept substantially constant if the average value of the pulse frequency is below a certain value which is greater than $n \cdot f$. With increasing output the pulse length is increased at substantially constant pulse frequency. The mentioned maximum pulse frequency is selected suitably so that it differs from $m \cdot n \cdot f$, where $m$ is a small whole number.

When feeding a D.C. motor, at low output and thus long intervals between the groups, vibrations and uneven running of the motor are often obtained due to extreme variations in the load current. Acording to one embodiment, therefore, the time-lag between the pulses in each group is made greater than $\Delta t$ at low output. The peak value of the current is thus decreased and more even running is obtained.

The load object being fed consists in certain cases of several part-loads, for example a number of D.C. motors. These may be parallel-connected and be fed through a common switching device from the D.C. source as described above. It has been found, however, that an advantageous effect is obtained if the load object is divided into as many part-loads ($n$) as the number of pulses in a pulse group and each part-load is supplied with one pulse per pulse group.

A typical load object may consist of four driving motors for a rail vehicle. These may be parallel-connected and supplied with, for example, two pulses per pulse group ($n=2$) so that the time-lag between the pulses in the group is $$\Delta t = \frac{1}{2f}$$

where $f$ is the frequency component which is to be avoided.

According to one embodiment of the invention the load is instead divided into two part loads, each consisting of two parallel-connected motors and each part load is supplied with one pulse per pulse group. Each motor is thus supplied with one pulse per pulse group instead of two in accordance with the first-mentioned method. At a certain average value of the direct voltage over the motor, the average value of the pulse frequency must consequently, at unchanged pulse length and feeding voltage, be twice as high in the latter method as in the former. This is advantageous since at a higher frequency it is less likely that a harmonic will coincide with the frequency which it is desired to avoid. Furthermore, since each pulse is supplied to two motors instead of four, the amplitude of the current pulses will be half as great, which will then also be the case with the amplitude of the A.C. components in the current from the D.C. source.

The invention also relates to a means for carrying out the method, that is a means for supplying a load object connected to a D.C. source with D.C. pulses having variable pulse frequency, which means comprises a switching means connected in series with the load object, a control means connected to said switching means and arranged periodically to steer this to the conducting state, whereby D.C. pulses are supplied to the load object. The means is characterised in that the control means is arranged to steer said switching means so that, when the average value of the pulse frequency is smaller than a certain limit, $f_0$, the load object is supplied with D.C. pulses in groups of $n$ pulses per group having variable time-lag between the groups and constant time-lag, $\Delta t$, between the pulses in each group, so chosen that $$\Delta t = \frac{1}{f_0}$$

A preferred embodiment in which the switching means comprises a thyristor and the steering means comprises a pulse generator, the output of which is connected to the control electrode of the thyristor, and which is arranged to deliver ignition pulses to the thyristor, the time-lag between the pulses being dependent on a control signal supplied to the generator, is characterised in that a switching member is arranged, after each of the $(n-1)$ first pulses in a group, to supply to the generator a control signal corresponding to $\Delta t$ and after the last pulse in each group a control signal corresponding to the desired time-lag between the groups.

It is easiest to arrange each group to consist of two pulses. The switching means then suitably consists of a bistable circuit arranged to be controlled by the pulses from the pulse generator so that at each pulse it switches from one to the other of its two positions. A control voltage source is then arranged to generate a voltage corresponding to $\Delta t$ which is connected by means of an electronic contact to one input of a selecting means having two inputs, to the other input of which is connected a control voltage corresponding to the desired time-lag between the groups, and the output of which is connected to the control input of the pulse generator. The selecting means is arranged to select the one of these two control voltages which corresponds to the shortest time interval and pass it on to the pulse generator. The bistable circuit is connected to the electronic contact and arranged to close the contact when in one of its two positions.

According to one embodiment of the invention the load object is divided into $n$ part-loads and the switching member into $n$ part-switching means and each part-load, in series with a part-switching means, is connected to the D.C. source, which part-switching means is arranged to supply the part-load with one pulse per pulse group.

BRIEF DESCRIPTION OF THE DRAWINGS

In the following the invention will be described more fully with reference to the accompanying drawings. FIG. 1 shows the load current as a function of the time, FIG. 2 is a block diagram of a feeding means according to the invention, FIGS. 3 and 4 show circuits to generate ignition voltages to the main and extinguishing thyristor.

DESCRIPTION OF THE PREFERRED EMBODIMENTS

Figure 5:
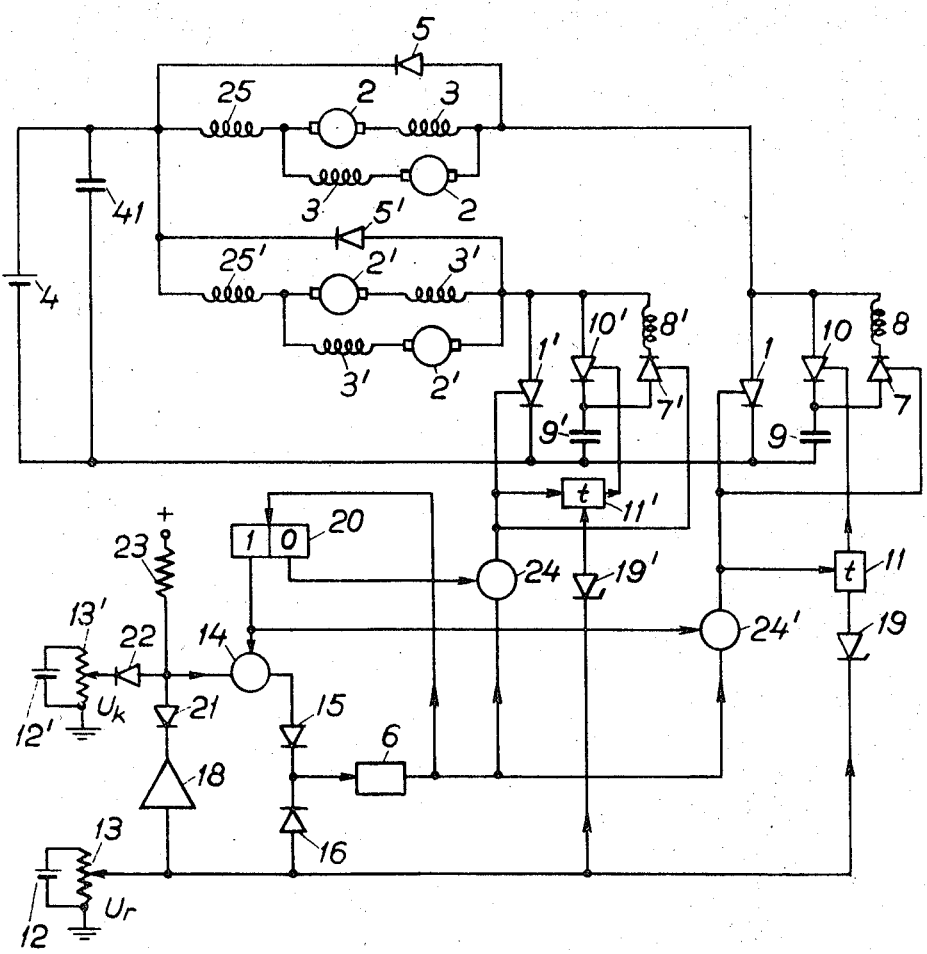
FIG. 5 shows an arrangement where the load object is divided into two part-loads which are fed by the D.C. source through individual part-switching means.

FIG. 1a shows the current from the voltage source as a function of the time in a system having the same time-lag between all the pulses. Assuming a certain time-lag, $1/f$, between the pulses, the current has a strong A.C. component with frequency $f$. If the pulse frequency is continuously variable this component will have a high amplitude every time the pulse frequency is exactly $f$. According to the invention this component is eliminated, in accordance with FIG. 1b, by combining the pulses into groups of two pulses with a constant time-lag $$T_1 = \frac{1}{2f}$$

The time-lag $T_2$ between the groups is variable from $1/2f$ upward. The average value of the current is the same in both the FIGS. 1a and 1b.

FIG. 2 shows a block diagram of an arrangement according to the invention. The thyristor 1 is connected in series with a D.C. series motor with armature 2 and field winding 3 to a D.C. source 4. A free-wheel rectifier 5 is connected in parallel with the motor. The pulse generator 6 delivers ignition pulses to the thyristor at intervals determined by an input control signal. An extinguishing circuit consisting of auxiliary thyristor 7, reactor 8, capacitor 9 and extinguishing thyristor 10 extinguishes the thyristor 1 a certain time after the ignition. This time is determined by the control pulse device 11 of the extinguishing thyristor, which is designed as a delay circuit with variable delay action and which receives an impulse when the main thyristor is ignited and after said time delivers an ignition pulse to the thyristor 10. The D.C. motor thus has a pulsing direct current flowing through it.

The average value of the current is controlled by a voltage $U_r$ obtained from the resistor 13 connected to the voltage source 12, the voltage being supplied through the diode 16 to the pulse generator 6 so that a higher voltage produces a higher pulse frequency. From the resistor 13' connected to the voltage source 12' a voltage $U_k$ is obtained which is adjusted to provide a pulse frequency at which the time-lag between two pulses is exactly $1/2f$, where $f$ is the frequency to be eliminated. This voltage is supplied to the pulse generator 6 through the electronic contact 14 and the diode 15. The contact is controlled by the bistable circuit 20 and is closed when the bistable circuit is in the 1-position, and otherwise open. The bistable circuit is controlled alternately to its two positions by pulses from the pulse generator.

The arrangement functions as follows: If $U_r$ is assumed to be less than $U_k$, which is the case at low output, and the bistable circuit 20 is in 0-position, the next pulse from the pulse generator will switch the bistable circuit to its 1-position. The contact 14 closes and $U_k$ and $U_r$ are supplied to the two diodes 15 and 16 forming the selecting means which then passes the greater of these two voltages, in this case $U_k$, on to the pulse generator. After a certain interval $$\left(T_1 = \frac{1}{2f}\right)$$

an ignition pulse is delivered to the thyristor 1, the bistable circuit is switched to its 0-position, the contact 14 opens and $U_r$ is supplied to the pulse generator which, after a longer interval ($T_2$) determined by $U_r$, again delivers an ignition pulse to the thyristor 1.

If $U_r$ is increased it will after a time become equal to $U_k$ and all the pulse intervals will be equal to $1/2f$. If $U_r$ is increased even further, the pulse frequency will increase but with the same time-lag between all the pulses. At a certain pulse frequency, for example around $3.5 \cdot f$, the frequency will no longer increase and a signal is obtained through the Zener diode 19 to the control pulse device 11 of the auxiliary thyristor so that the pulse length at a constant pulse frequency increases successively with increasing $U_r$ until finally the direct current through the motor becomes continuous.

With low values of $U_r$ the time-lag between two pulse groups becomes large and the variations in the motor current will be large. This is prevented through the output voltage from the amplifier 18 being lower than $U_k$ at such low values of $U_r$. The selector circuit 21, 22, 23 selects the lower of these values which produces an increased time-lag between the pulses in each group. The peak value of the motor current will therefore be reduced which gives more even running of the motor.

FIG. 3 shows the pulse generator 6 which is a conventional relaxation oscillator having a double base diode 61. The charging speed of the capacitor 64 is controlled by the transistors 62 and 63. A higher positive input signal to the input $a$, which is connected to the diodes 15 and 16, produces a shorter time-lag between the pulses. The circuit is adjusted so that the transistor 62 is saturated at such an input voltage that the pulse frequency is approximately $3.5 \cdot f$, and the pulse frequency will there be constant if the input voltage is further increased. The ignition pulses are amplified in the amplifier 66 and passed on to the thyristor 1, auxiliary thyristor 7, control pulse device 11 of the extinguishing thyristor and bistable circuit 20 through the secondary windings 651–654 of the transformer 65.

FIG. 4 shows the control pulse device 11 of the extinguishing circuit. The capacitor 114, the charging speed of which is determined by the transistor 115, together with the double base diode 116, forms a relaxation oscillator with output $a$. The transistors 111 and 112 comprise a bistable circuit. The transistor 112 is usually conducting and short circuits the capacitor 114 through the diode 113. A negative pulse to the input $b$ from the control pulse device 6 of the main thyristor makes the transistor 111 conducting, the capacitor 114 is charged and after a certain time a positive ignition pulse is supplied from the output $a$ to the extinguishing thyristor. At the same time a negative pulse is obtained across the resistor 117 which, through the diode 118, cuts off the transistor 111. The voltage to the input $c$ determines the delay between input and output pulses. A more positive voltage produces through the transistor 119 a lower bias of the transistor 115 and thus a longer delay, which corresponds to a longer pulse length of the load current.

FIG. 5 shows a means to control the four D.C. series motors 2 and 2'. The motors are divided into two identical groups. The motors 2 having field windings 3 are parallel connected and, together with the smoothing reactor 25, are also parallel-connected to the free-wheeling diode 5, and in series with the thyristor 1 are connected to the D.C. source 4 which may comprise a D.C. network. The capacitor 41 smoothes variations in the current from the source. The extinguishing capacitor 9 is charged in known manner with the help of the inductance 8 and the auxiliary thyristor 7 which receives an ignition pulse simultaneously with the main thyristor, and is dicharged when the circuit 11 ignites the extinguishing thyristor 10 a certain time $t$ after ignition of the main thyristor. The pulse generator 6 delivers ignition pulses to the main thyristors 1 and 1' with a time interval between the pulses which decreases with increasing value of the input signal obtained from the selector circuit 15, 16. The bistable circuit 20 with the help of the electronic contacts 24 and 24', directs the ignition pulses alternately to the thyristors 1 and 1'.

At low output $U_r$ is smtller than $U_k$ and determines alternate intervals between two pulses, these intervals comprising the time-lag between two pulse groups. Alternate intervals are determined by $U_k$ which is adjusted so that the length of these intervals, comprising the time-lag between the two pulses in a group, is $1/2f$, where $f$ is the frequency of the alternating current component to be eliminated. If $U_r$ is greater than $U_k$, all the intervals will be of equal length and determined by $U_r$. If $U_r$ is increased so much that the breakthrough voltage of the Zener diodes 19, 19' is reached a signal is delivered to the delay circuits 11, 11' so that, upon a further increase of $U_r$, their pulse length is increased. The oscillator 6 is so adjusted that, when $U_r$ exceeds the breakthrough voltage of the Zener diodes, its frequency increases only negligibly or not at all.

We claim:

1. A method for suppression of an A.C. component of a given frequency ($f$) in the current from a D.C. source when supplying a load object from said source with D.C. pulses with a variable pulse frequency, said method comprising the steps of, when the average value of said pulse frequency is below a certain limit, supplying the load object with groups of pulses containing $n$ pulses in each group, varying the time interval between said groups and maintaining the time interval ($\Delta t$) between the pulses in each group constant and equal to $$\frac{1}{f \cdot n}$$

said limit being the average frequency at which the time interval between two consecutive groups is $\Delta t$.

2. A method according to claim 1, maintaining the pulse length substantially constant when the average value of the pulse frequency is at least equal to $f \cdot n$ but less than a certain value greater than $f \cdot n$, and, if the average load voltage is to be increased above the voltage corresponding to said greater value of the average pulse frequency, increasing the pulse length while maintaining a substantially constant pulse frequency.

3. A method according to claim 1, the time interval between the pulses in a group being larger than $$\frac{1}{n \cdot f}$$

when the average pulse frequency is substantially smaller than $n \cdot f$.

4. A method according to claim 1, for supply of a load object which comprises $n$ parts, comprising supplying each part with one pulse of each group of pulses.

5. A circuit for supplying D.C. pulses with a variable frequency from a D.C. source to a load object, said circuit comprising a switching means connected in series with the load object, a control means connected to said switching means and arranged periodically to steer this switching means to the conducting state, whereby D.C. pulses are supplied to the load object, said control means including means responsive to an average value of the pulse frequency smaller than a certain limit ($f_0$) to control said switching means to supply the load object with D.C. pulses in groups of $n$ pulses per group, means to vary the time interval between said groups, the time interval ($\Delta t$) between consecutive pulses in the groups being constant and equal to $1/f_0$.

6. A circuit according to claim 5, said switching means comprising a thyristor connected in series with said load object, said control means comprising a pulse generator with its output connected to the gate of said thyristor in order to supply ignition pulses thereto, said pulse generator including means responsive to a control signal supplied thereto to determine the time interval between consecutive pulses, a first control signal source generating a control signal corresponding to $\Delta t$, a second control signal source generating a control signal corresponding to the desired time interval between two consecutive pulse groups, a selecting means to connect said first control signal source to the control signal input of said pulse generator after each of the first ($n-1$) pulses in each group and to connect said second control signal source to said input after the last of the pulses in each group.

7. A circuit according to claim 6, for supply of a load object with pulse groups consisting of two pulses per group, comprising a bistable circuit, the output of said pulse generator being connected to the input of said bistable circuit, each pulse from the generator causing the bistable circuit to go from one of its stable states to the other, said selecting means having a first and a second input, said first control signal source being connected to said input by way of an electronic contact, said second control signal source being connected to said second input, said selecting means comprising a logic circuit that selects that control signal which corresponds to the shortest time interval and supplies this control signal to the pulse generator input, the bistable circuit including means to close said electronic contact when the circuit is in one of its stable states, and to open it when it is in the other of said states.

8. A circuit according to claim 5, for supply of a load object which comprises $n$ parts, said switching means comprising $n$ switching elements, each of said parts being connected to the D.C. source in series with a switching element, said control means including means to control each of said switching means so that each part of the load object is supplied with one pulse per pulse group.

References Cited

UNITED STATES PATENTS

| | | | |
|---|---|---|---|
| 2,554,987 | 5/1951 | Hogle | 328—166 |
| 3,065,361 | 11/1962 | Brook | 328—166X |
| 3,090,922 | 5/1963 | Diggelmann | 328—59X |
| 3,448,389 | 6/1969 | Suzuki et al. | 307—271X |

JOHN S. HEYMAN, Primary Examiner

U.S. Cl. X.R.

328—61; 307—271, 283